United States Patent [19]

Lee

[11] Patent Number: 5,267,260
[45] Date of Patent: Nov. 30, 1993

[54] SPREAD SPECTRUM RECEIVER USING THE CODE DIVISION MULTIPLE ACCESS MODE

[75] Inventor: Chang-yong Lee, Suwon, Rep. of Korea

[73] Assignee: Samsung Electronics Co., Ltd., Suwon, Rep. of Korea

[21] Appl. No.: 979,055

[22] Filed: Nov. 19, 1992

[51] Int. Cl.[5] .............................................. H04K 1/00
[52] U.S. Cl. .......................................... 375/1; 380/34
[58] Field of Search .............................. 375/1; 380/34

[56] References Cited

U.S. PATENT DOCUMENTS

| | | | |
|---|---|---|---|
| 4,485,477 | 11/1984 | Nossen | 375/1 |
| 4,672,629 | 6/1987 | Beier | 375/1 |
| 5,081,644 | 1/1992 | Uchida et al. | 375/1 |
| 5,121,407 | 6/1992 | Partyka et al. | 375/1 |
| 5,151,921 | 9/1992 | Hashimoto | 375/1 |
| 5,179,573 | 1/1993 | Paradise | 375/1 |

Primary Examiner—Tod R. Swann
Attorney, Agent, or Firm—Robert E. Bushnell

[57] ABSTRACT

A receiver operated using a spread spectrum code division multiple access mode includes integrators for respectively integrating two signals of an in-phase channel and a quadrature channel, a comparator for comparing the two integrated signals, and a multiplexer for selectively outputting a signal having the greater magnitude between the two signals of the in-phase and quadrature channels in accordance with the result of the comparison in the comparator. Therefore, one channel outputting a signal having the greater magnitude between the two signals is selected to despread and demodulate the signal, using the regular difference of the outputs from the in-phase and quadrature channels. Thus, the favorable channel conditions can be maintained, and the despreading and demodulating can be simplified.

8 Claims, 2 Drawing Sheets

SPREAD SPECTRUM RECEIVER USING THE CODE DIVISION MULTIPLE ACCESS MODE

BACKGROUND OF THE INVENTION

The present invention relates to a communication system operated by means of a code division multiple access mode, and more particularly to a spread spectrum receiver using the code division multiple access (CDMA) mode for integrating two received signals from in-phase (I) and quadrature (Q) channels, and selecting the signal of the channel having the larger amplitude between the two integrated signals, thereby easily despreading and demodulating the signal.

Communication systems operated using the spread spectrum CDMA mode transmit digital data. By utilizing a mixer (or an exclusive OR gate) for mixing a relatively high frequency signal with a pseudo-noise code, a spread signal having an extremely wide bandwidth and a low spectral density is produced, and then the spread signal is transmitted during the general spread spectrum CDMA mode, in order to eliminate or decrease continuous wave (CW) and jamming signals. Thus, such a communication system is made suitable for the communications within a building. Also, the signal having low spectral density decreases the interference of several radio waves.

U.S. Pat. No. 5,121,407 discloses a spread spectrum receiver which has recently been developed. Here, the CW and jamming signals are eliminated or decreased by utilizing frequency shift unit without requiring automatic gain controller to receive and stably demodulating the signal formed and transmitted according to the above-described method, so that short delay multi-path problem within a building is solved, frequency and dynamic range which is a variable operational characteristic of a tuner are enlarged, and acquisition time of the signal is reduced.

Further, as shown in FIG. 1, a generalized spread spectrum receiver using the CDMA mode includes: first and second mixers 11 and 12 for down-converting a received spread signal, using local oscillator frequencies $f_{LO1}$ and $f_{LO2}$; a first RF (radio frequency) amplifier 13 for amplifying the frequency-converted signal; a voltage controlled oscillator 14 for producing a coherence clock; a frequency shift unit 24 for shifting the phase of the reference frequency (the coherence clock) by as much as 90° ($\pi/2$); first and second low-pass filters 15 and 16 for eliminating two spread signal components of an I channel and a Q channel, respectively; third RF amplifiers 17 and 18 for amplifying each filtered signal; first and second analog-to-digital (A/D) converters 19 and 20 for respectively converting the amplified signals into digital signals; an absolute value detector 21 for obtaining absolute values of two signals of the I and Q channels, a peak detector 22 for detecting the peak of the absolute values; and a despreading demodulator 23 for despreading the selected signal to produce an original signal.

In the receiver of the conventional spread spectrum CDMA mode formed as the above, the peaks of the absolute values with respect to two signals are taken and then summed, thereby obtaining the signal value. In more detail, a spread signal transmitted from a transmitter is received, and the received signal is down-converted, using output frequencies $f_{LO1}$ and $f_{LO2}$ of the local oscillators in first and second mixers 11 and 12. Then, the signal is amplified in first RF amplifier 13, and mixed with a coherence signal $f_{corh}$, thereby producing a signal of the I channel. Additionally, a signal of the Q channel is produced such that a signal $f_{corh+90°}$ obtained by shifting the coherence signal $f_{corh}$ signal supplied from voltage controlled oscillator 14 by 90° in frequency shift unit 24 is mixed with the signal supplied after being amplified in first RF amplifier 13. The two signals of the I and Q channels generated according to the foregoing method are passed and filtered through first and second low-pass filters 15 and 16, respectively, so that spread signal components are eliminated. Thereafter, the filtered signals are amplified, using second and third amplifiers 17 and 18. The absolute values of two signals of the I and Q channels which have been digitized via first and second A/D converters 19 and 20 are obtained in absolute value detector 21. Finally, the peaks of the absolute values are detected in peak detector 22, and then the peaks are summed, thereby obtaining the signal value.

Another method for processing a spread signal is the so called costas loop system, in which the difference component between the two signals of the I and Q channels obtained in the above manner is extracted. Then, the spread signal value is obtained from one channel between the I and Q channels, by supplying an error voltage to a voltage controlled oscillator which generates a coherence signal, using a phase-locked loop.

The method which obtains the signal value by taking and then summing the peaks with respect to absolute values complicates the circuit since the signal processing is performed by taking the absolute values of two signals in the I and Q channels, obtaining the peaks of the absolute values, and then summing the peaks to obtain the signal value. Moreover, if the condition of one channel is poor during the summing of the signals of the I and Q channels, an abnormal signal appears in the resultant sum. Meanwhile, since the costas loop system obtains the signal value from the output of one signal channel, the output becomes abnormal in case of an irregular loop or poor channel conditions, and more particularly, there is no output when the phase is delayed.

SUMMARY OF THE INVENTION

Therefore, it is the object of the present invention to provide a spread spectrum receiver using the code division multiple access mode, wherein received spread signals are integrated, two integrated signals are compared, and then the spread signal having the greater integrated value is selected to be despread and demodulated, thereby enhancing demodulation.

To achieve the object of the present invention, there is provided a spread spectrum receiver using the code division multiple access mode comprising:

integrating means for integrating signals of an in-phase channel and a quadrature channel, respectively;

comparing means for comparing the signals integrated in each integrating means; and multiplexing means for selectively outputting a signal having the greater magnitude between the two signals of the in-phase and quadrature channels in accordance with the result of the comparison in the comparing means, whereby one channel outputting a signal having the greater magnitude between in-phase and quadrature channels is selected to despread and demodulate the signal.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
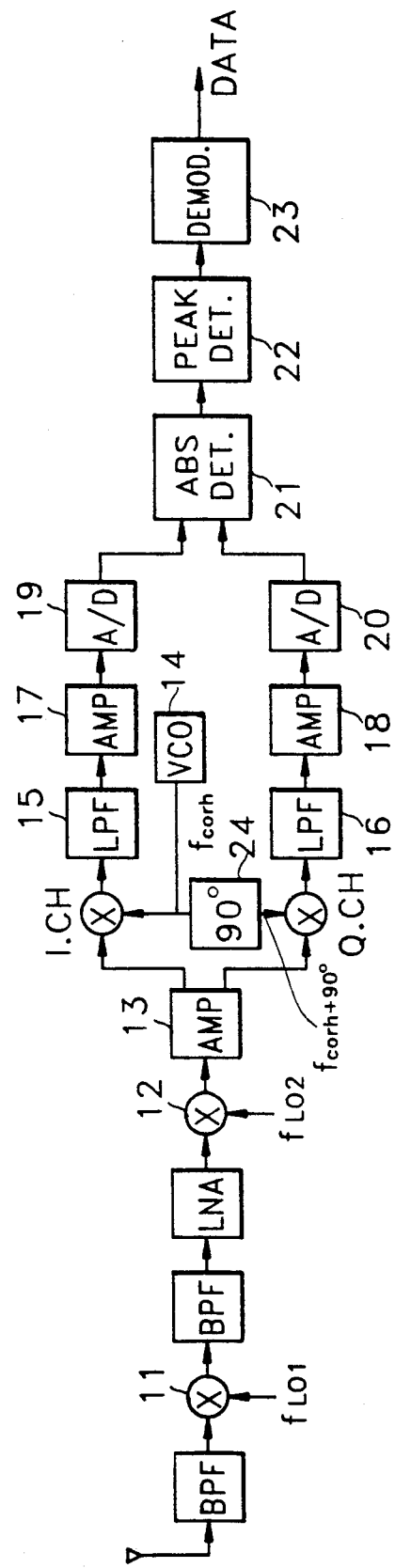
FIG. 1 is a block diagram showing a conventional spread spectrum receiver using the code division multiple access mode.
Figure 2:
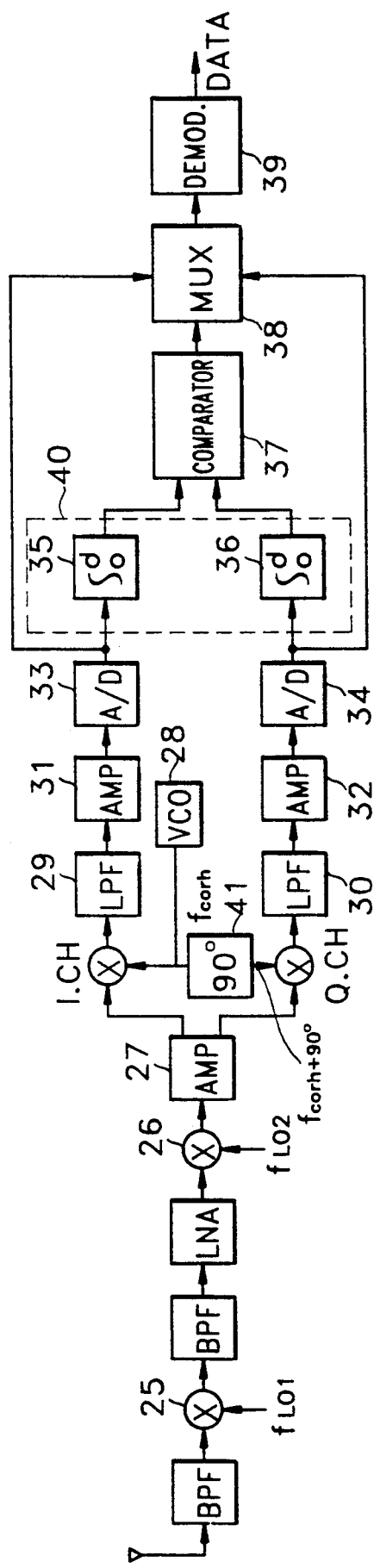
FIG. 2 is a block diagram showing a spread spectrum receiver using the code division multiple access mode according to the present invention.

As shown in FIG. 2, a spread spectrum receiver using the code division multiple access (SS/CDMA) mode according to the present invention comprises: first and second mixers 25 and 26 for down-converting a received spread signal, using local oscillator frequencies $f_{LO1}$ and $f_{LO2}$; a first RF amplifier 27 for amplifying the frequency-converted signal; a voltage controlled oscillator 28 for producing a coherence clock; a frequency shift unit 41 for shifting the phase of the reference frequency (the coherence clock) by 90° ($\pi/2$); first and second low-pass filters 29 and 30 for eliminating spread signal components of an I channel and a Q channel, respectively; second and third RF amplifiers 31 and 32 for amplifying each filtered signal; first and second analog-to-digital (A/D) converters 33 and 34 for respectively converting the amplified signals into digital signals; a first integrator 35 for integrating the signal of the I channel converted via first A/D converter 33; a second integrator 36 for integrating the signal of the Q channel converted via second A/D converter 34; a comparator 37 for comparing two signals integrated in first and second integrators 35 and 36; a multiplexer 38 for selectively outputting the larger signal between the two in accordance with the result of the comparison; and a despreading demodulator 39 for despreading the selected signal to produce an original signal.

Figure 3:
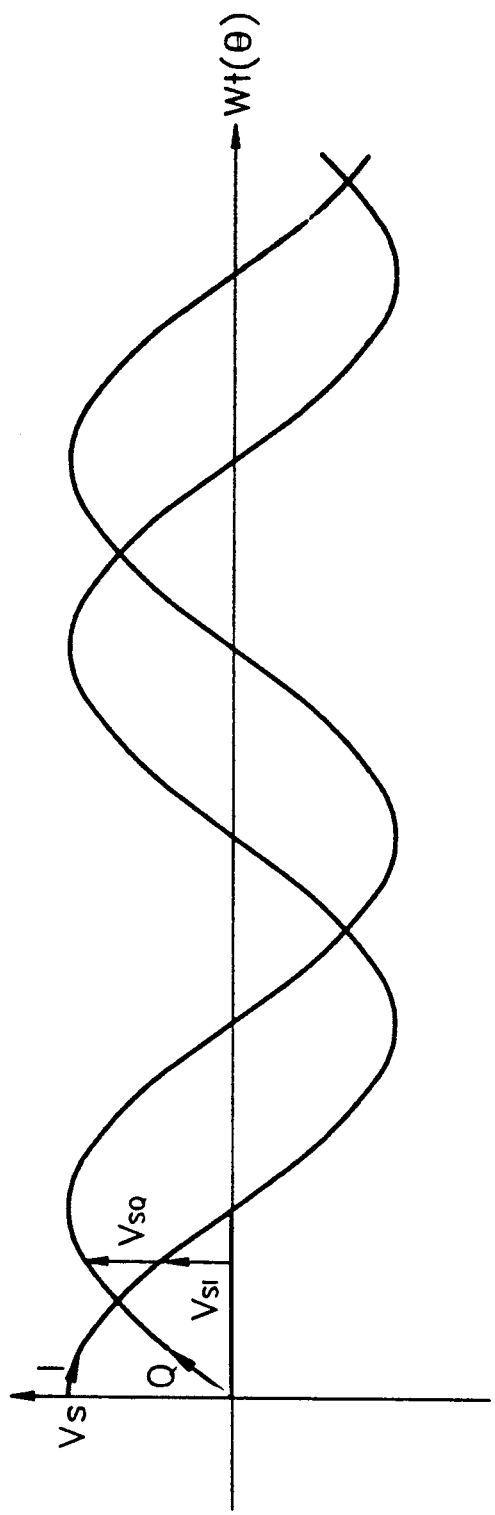
FIG. 3 is a diagram showing the signal levels of the I and Q channels in accordance with their phase.

FIG. 3 is a diagram showing the signal levels of the I and Q channels according to phase.

Referring to FIG. 3, the signal levels of the channels in accordance with the phase $\theta$ of the I and Q channels are such that the channel is $V_{SQ}$ when the I channel is $V_{SI}$. Accordingly, the signals in the I and Q channels mixed by means of the coherence clock have a phase difference by 90° ($\pi/2$), the magnitude of signal levels $V_{SI}$ and $V_{SQ}$ of the I and Q signals at an optional angular velocity $\omega t(\theta)$ has a regular relationship with the phase. However, due to a slight variance in the coherence clock phase $\theta(\omega t)$ component or a delay in the basic circuit, the signal level $V_{SQ}$ crosses zero at the maximum point of $V_{SI}$ while the signal level $V_{SI}$ crosses zero at the maximum point of $V_{SQ}$ in both I and Q channels, so that the demodulation (despreading) of the signal depending on a single channel causes problems. In other words, when the value of the received signal occurs near "zero" in accordance with the phase difference of the coherence clock or the received spread signal, the received signal is difficult to demodulate.

Therefore, the receiver using the SS/CDMA mode according to the present invention constructed as above is devised to facilitate despreading demodulation by selecting the one channel between the I and Q channels, which has the larger signal magnitude being integrated for a predetermined time. For this purpose, a spread signal transmitted from a transmitter is received, and the received signal is down-converted via first and second mixers 25 and 26, using local oscillator output frequencies $f_{LO1}$ and $f_{LO2}$. Thereafter, this down-converted signal is amplified in first RF amplifier 27, and then mixed with coherence signal $f_{corh}$, thereby producing the signal of the I channel. Additionally, a signal of the Q channel is produced such that a signal $f_{corh+90°}$ obtained by shifting the phase of coherence signal $f_{corh}$ from voltage controlled oscillator 28 by 90° in frequency shift unit 41, is mixed with the spread signal supplied after being amplified in first RF amplifier 27.

The two signals of the I and Q channels generated according to the foregoing manner are passed and filtered through first and second low-pass filters 29 and 30, respectively, so that the spread signal components are eliminated. Thereafter, the filtered signals are amplified in second and third amplifiers 31 and 32, and then digitized via first and second A/D converters 33 and 34. The signal values of the I and Q channels are integrated in first and second integrators 35 and 36 by N times (where, N is an integer) of one PN period. The results of the integrated two signals are compared in comparator 37. Thus, the signal of the channel having the larger signal magnitude is output in the multiplexer 38 in such a manner that, if the integrated signal of the I channel is greater than that of the Q channel, the signal value of the I channel is selected, and otherwise, the A/D converted signal output of the Q channel is selected. At this time, the output signal value of the selected channel is multiplexed with a PN code in despreading demodulator 39, and the originally transmitted signal is restored based on the result of the multiplexing, thereby demodulating the received spread signal.

As a result, in the spread spectrum receiver utilizing the CDMA mode according to the present invention, by using a regular output difference between I and Q channels, a signal having the greater magnitude between two signals is selected and then despread and demodulated, so that channel conditions can be favorably maintained, and the spreading demodulation is markedly simplified.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A spread spectrum receiver using the code division multiple access mode comprising:

integrating means for integrating an in-phase channel signal and a quadrature channel signal, respectively, for producing integrated signals;

comparing means for comparing said integrated signals and outputting a resultant signal; and multiplexing means, responsive to said resultant signal, for selectively outputting a selected signal, said selected signal being one of said in-phase channel or quadrature channel signals having a greater magnitude than the other of said in-phase channel or quadrature channel signals; and means to despread and demodulate said selected signal.

2. The spread spectrum receiver using the code division multiple access mode as claimed in claim 1, wherein each of said integrating means integrates a respective one of said in-phase channel and quadrature channel signals by N times, a pseudo-noise period.

3. A method of demodulation in a spread spectrum receiver, said method comprising the steps of:
- integrating an in-phase channel signal for producing a first integrated signal;
- integrating a quadrature channel signal for producing a second integrated signal;
- comparing said first and second integrated signal for producing a resultant signal based on the magnitude of said first and second integrated signals;
- selecting one of said in-phase channel signal or said quadrature channel signal in response to said resultant signal, the selected one of said in-phase channel signal or said quadrature channel signal having a magnitude greater than the other of said in-phase channel signal or said quadrature channel signal; and
- demodulating said selected one of said in-phase channel signal or said quadrature channel signal.

4. The method as claimed in claim 3, wherein each of said integrating steps comprises:
- integrating said in-phase and quadrature channel signals by N times one pseudo-noise period, where N is an integer.

5. The method as claimed in claim 3, wherein said demodulating step comprises:
- multiplexing said selected one of said in-phase channel signal or said quadrature channel signal with a pseudo-noise code in a despreading demodulator.

6. A spread spectrum receiver using a code division multiple access mode, said spread spectrum receiver comprising:
- first integrating means for integrating an in-phase channel signal for producing a first integrated signal;
- second integrating means for integrating a quadrature channel signal for producing a second integrated signal;
- a comparator for comparing said first and second integrated signal for producing a resultant signal based on the magnitude of said first and second integrated signals;
- multiplexing means for selecting one of said in-phase channel signal or said quadrature channel signal in response to said resultant signal, the selected one of said in-phase channel signal or said quadrature channel signal having a magnitude greater than the other of said in-phase channel signal or said quadrature channel signal; and
- means for demodulating said selected one of said in-phase channel signal or said quadrature channel signal.

7. The spread spectrum receiver as set forth in claim 6, wherein said means for demodulating multiplexes said selected one of said in-phase channel signal or said quadrature channel signal with a pseudo-noise code.

8. The spread spectrum receiver as set forth in claim 7, wherein each of said first and second integrating means respectively integrates said in-phase and said quadrature channel signals by N times one pseudo-noise period, wherein N is an integer.

* * * * *

UNITED STATES PATENT AND TRADEMARK OFFICE
CERTIFICATE OF CORRECTION

PATENT NO. : 5,267,260
DATED : 30 November 1993
INVENTOR(S) : Chang-yong LEE

It is certified that error appears in the above-indentified patent and that said Letters Patent is hereby corrected as shown below:

Column 3,    line 48,    after "are such that the", insert --Q--:

Signed and Sealed this

Nineteenth Day of November, 1996

Attest:

BRUCE LEHMAN

*Attesting Officer*        *Commissioner of Patents and Trademarks*